(12) United States Patent
Reeves et al.

(10) Patent No.: US 7,076,796 B2
(45) Date of Patent: Jul. 11, 2006

(54) VIRTUAL MEDIA FROM A DIRECTORY SERVICE

(76) Inventors: Drue A. Reeves, 27630 Christiana Cir., Magnolia, TX (US) 77355; E. David Neufeld, 19900 Indigo Lake Dr., Magnolia, TX (US) 77355; Christopher Davenport, 11100 Louetta #827, Houston, TX (US) 77070

( * ) Notice: Subject to any disclaimer, the term of this patent is extended or adjusted under 35 U.S.C. 154(b) by 850 days.

(21) Appl. No.: 10/038,239

(22) Filed: Jan. 4, 2002

(65) Prior Publication Data

US 2003/0131246 A1     Jul. 10, 2003

(51) Int. Cl.
| | |
|---|---|
| *G06F 15/16* | (2006.01) |
| *G06F 17/30* | (2006.01) |
| *G06F 7/04* | (2006.01) |
| *G06F 7/58* | (2006.01) |
| *G06K 19/00* | (2006.01) |
| *G06K 9/00* | (2006.01) |
| *H04L 9/32* | (2006.01) |

(52) U.S. Cl. .......................... 726/3; 713/182; 709/217; 709/219; 709/227

(58) Field of Classification Search ................ 713/201, 713/2, 182; 709/217, 219, 227, 220; 726/2, 726/26, 3
See application file for complete search history.

(56) References Cited

U.S. PATENT DOCUMENTS

| | | | |
|---|---|---|---|
| 5,790,895 A | 8/1998 | Krontz et al. ................ | 395/884 |
| 5,898,861 A | 4/1999 | Emerson et al. ............ | 395/500 |
| 6,629,127 B1 * | 9/2003 | Deen et al. .................. | 709/203 |
| 6,681,330 B1 * | 1/2004 | Bradford et al. ............ | 713/200 |

(Continued)

OTHER PUBLICATIONS

Active Directory Overview; Posted on Jun. 30, 1999; Microsoft; p. 1-11.*
Exploring Netscape's Directory Server 3.0, by Tao Zhou, publication data Apr. 1998; p. 1-11.*
Emerson et al., "Operating System Independent Method and Apparatus for Graphical Remote Access," U.S. Appl. No. 09/438,253, filed Nov. 12, 1999.
Frantz et al., "USB Virtual Devices," U.S. Appl. No. 09/544,573, filed Apr. 6, 2000.

(Continued)

*Primary Examiner*—Gilberto Barron, Jr.
*Assistant Examiner*—Samson Lemma (57) ABSTRACT

Virtual media images of actual physical media resources, such as O/S boot files and software installation disks, are provided in a remote directory structure. The remote directory structure stores the virtual media images along with access rights of multiple authorized users, such that control is provided over the retrieval of the virtual media images and use of data/programs within the images. The virtual media images may be stored in blocks, or multiple sub-blocks/children, corresponding the actual media resources. Moreover, the remote directory server may simply store virtual media pointers, or location identifiers, which point to another storage location (i.e., a remote computer) having the actual data content of the virtual media image. Accordingly, the directory server processes a user request for a desired portion of the virtual media images by evaluating whether the user is one of the plurality of authorized users and whether the access rights of the user encompass the desired portion. If the user is authenticated and the desired portion is within the user's access rights, then the user may obtain the desired portion of the virtual media images.

19 Claims, 9 Drawing Sheets

U.S. PATENT DOCUMENTS

2002/0059402 A1* 5/2002 Belanger ............... 709/220

OTHER PUBLICATIONS

Emerson et al., "Video Eavesdropping and Reverse Assembly to Transmit Video Action to a Remote Console," U.S. Appl. No. 08/733,254, filed Oct. 18, 1996.

"Compaq Remote System Management for Industry-Standard Servers," Compaq Computer Corporation Technology Brief, Sep. 2001.

"Remote Server Management with Integrated Remote Console," Compaq Computer Corporation Technology Brief, Oct. 21, 1996.

* cited by examiner

VIRTUAL MEDIA FROM A DIRECTORY SERVICE

FIELD OF THE INVENTION

The present invention relates generally to network services, such as directory services. More particularly, the present invention provides remote director access to a virtual media representation of a standard physical media, such as computer disks for a software application, an operating system, or a boot process.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In a networked computing environment, computer systems belonging to many users are connected together so that they may communicate with each other and share resources. In a typical client-server network, each computer system is either a client computer system or a server computer system. Client computer systems provide the user with various software applications, such as word processing, graphics utilities, spreadsheets and databases. Server computer systems manage network resources for the client computer systems within the network. For example, one or more servers within a particular network may control network traffic, file systems, shared printer devices, shared applications, e-mail services, and various other resources. In this way, users can share access to each other's files and other resources from any location connected to the network. Networked computing has revolutionized the conduct of business around the world.

The evolution of networked computing has presented technologists with some challenging obstacles along the way. One obstacle is connecting computers that use different operating systems (OSs) and making them communicate efficiently with each other. Each different OS (or even variations of the same OS from the same company) has its own idiosyncrasies of operation and configuration. The interconnection of computers running different OSs presents significant ongoing issues that make day-to-day management of a computer network challenging.

Another significant challenge presented by the evolution of computer networking is the sheer scope of modern computer networks. At one end of the spectrum, a small business or home network may include a few client computers connected to a common server, which may provide a shared printer and/or a shared internet connection. On the other end of the spectrum, a global company's network environment may require interconnection of hundreds or even thousands of computers across large buildings, a campus environment, or even between groups of computers in different cities and countries. Such a configuration would typically include a large number of servers, each connected to numerous client computers.

Further, the arrangements of servers and clients in a larger network environment could be connected in any of a large number of topologies that may include local area networks (LANs), wide area networks (WANs) and municipal area networks (MANs). In these larger networks, a problem with any one server computer (for example, a failed hard drive, failed network interface card, OS lock-up, etc.) has the potential to interrupt the work of a large number of workers who depend on network resources to get their jobs done efficiently. Accordingly, considerable time is devoted to maintaining and optimizing networks for maximize productivity.

In recent years, the rapid expansion of networks and the potential hardware and software problems within and between each networked computer has caused considerable strain and significant interest in network management tools. Network managers typically install operating systems and applications software locally at each individual networked computer, making the task dependent on the availability of network managers. This on-site computer-by-computer management technique is very time-consuming for the network manager, who is often an outside network manager for multiple organizations. As the complexities of computer and network hardware and software continue to grow, the foregoing problems are becoming increasingly important to maintain the operability of networked computers.

In many client-server networks, client computer systems comprise diskless or headless computer systems. As opposed to traditional PCs, which have full hardware and software resources stored locally, diskless computer systems must boot from a remote computer system (i.e., a boot server) rather than from local storage. The configuration and start up files required for booting the diskless computer system are stored on the boot server, which transmits those files to users as requested and then subsequently authenticates the user's identity. Headless computer systems, such as headless servers, generally refer to computing devices lacking local interface devices. For example, a typical headless server may lack a local monitor, a keyboard, a mouse, and removable media devices (e.g., floppy disk drive, CD drive, DVD drive, tape drive, etc.). Although both diskless and headless computer systems may have significant hardware and software resources, the systems require considerable interaction with remote servers.

The remote boot process is one such interaction with remote servers. The typical remote boot process may utilize a variety of remote boot protocols, such as the pre-boot execution environment (PXE) specification and a part of the wired for management (WfM) specification. The remote boot process typically involves downloading a boot file from the boot server to the diskless computer system. The boot file includes a boot program and all the configuration and driver files needed to boot the diskless computer system and to connect with one or more server computer systems. After obtaining considerable access to the servers and data contents, the diskless computer system proceeds to execute the network login process on a login server. Accordingly, the remote boot process does not control or prevent access to the servers and data contents prior to the login process.

The relatively unrestricted data access during remote booting presents a network security problem, because the user may not actually be authorized to login to the server or access certain data on the server. Prior to the network login process, the user has access to network resources regardless of that user's identity or relationship to the organization. The security risk involved with the typical remote boot process is increasingly important for large organizations and research-oriented organizations, which may have confidential resources and other user-specific resources that are intended only for authorized users or network managers.

Accordingly, a need exists for a remote management and security system for networked computers that provides authorized users and network managers with needed media for the boot process, the software installation process, and other management functions that are typically performed on-site in a computer-to-computer process. A need also exists for remotely and automatically transmitting, installing and executing software, such as operating system software, applications software, boot files, installation files, configuration files and various other resources, to the various networked computers.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Virtual media images of actual physical media resources, such as O/S boot files and software installation disks, are provided in a remote directory server. The remote directory server stores the virtual media images along with access rights of multiple authorized users, such that control is provided over the retrieval of the virtual media images and use of data/programs within the images. The virtual media images may be stored in blocks, or multiple sub-blocks/children, corresponding the actual media resources. Moreover, the remote directory server may simply store virtual media pointers, or location identifiers, which point to another storage location (i.e., a remote computer) having the actual data content of the virtual media image. Accordingly, the directory server processes a user request for a desired portion of the virtual media images by evaluating whether the user is one of the plurality of authorized users and whether the access rights of the user encompass the desired portion. If the user is authenticated and the desired portion is within the user's access rights, then the user may obtain the desired portion of the virtual media images. Accordingly, the present technique provides secure access to the O/S boot files, the software installation disks and other media (as virtual media images of the actual physical media), thereby facilitating efficient configuration and management of the individual networked computers using the network rather than on-site computer management.

Figure 1:
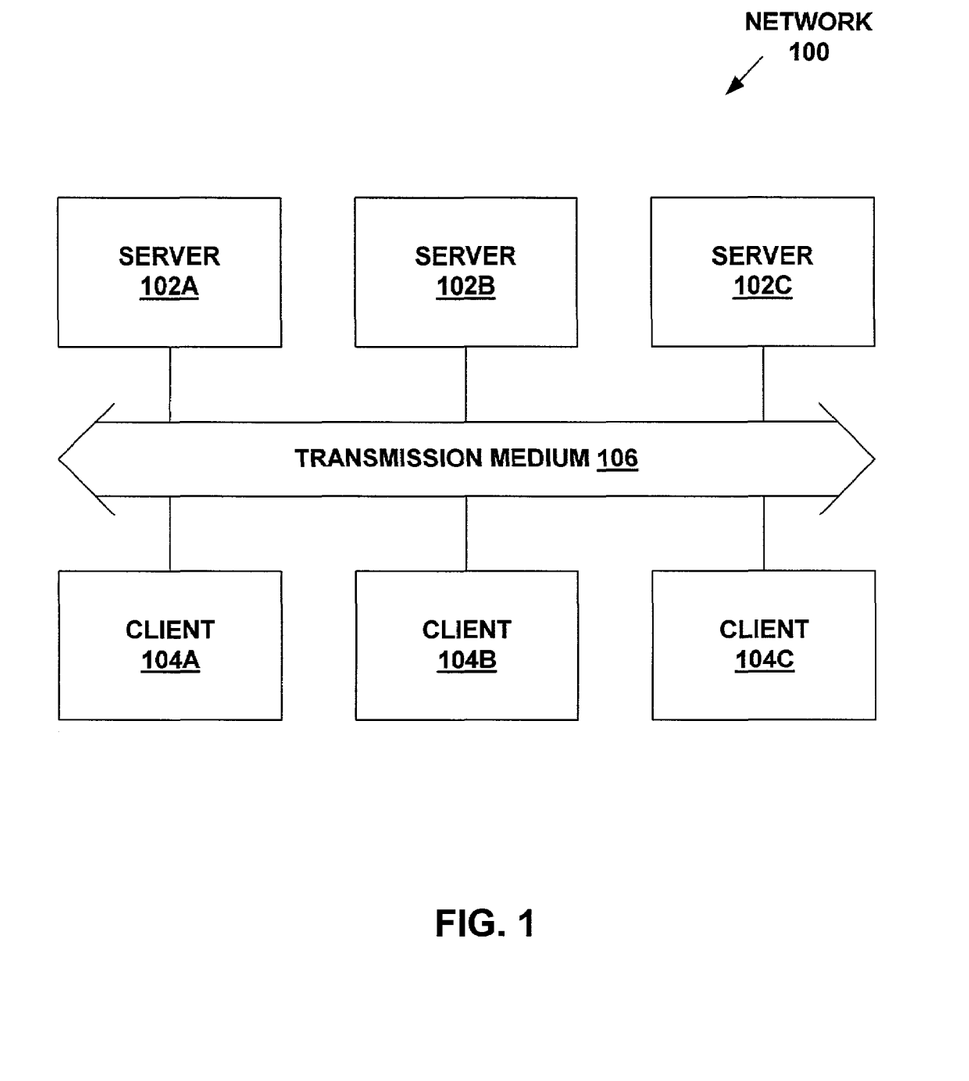
FIG. 1 is a diagram of one embodiment of a computer network (i.e., network) including multiple server computer systems (i.e., servers) and multiple client computer systems (i.e., clients) connected to a transmission medium.

An important aspect of efficiently managing a large computer network is to maximize security and to provide remote management, analysis and repair for the various networked devices and computers. Remote tools for initializing, analyzing, and servicing networked devices increase efficiency, increase productivity, and reduce costs for the network. The present technique provides various devices and techniques for more efficiently managing and securing networked resources. FIG. 1 is a diagram of an exemplary computer network 100, which comprises three server computer systems 102A, 102B, and 102C connected to a transmission medium 106, and three client computer systems 104A, 104B, and 104C also connected to the transmission medium 106. The server computer systems 102 and the client computer systems 104 communicate via the transmission medium 106. The transmission medium 106 may be a bus including multiple signal lines, a coaxial cable, a fiber-optic cable, or a wireless communication system. The server computer systems 102 and the client computer systems 104 are arranged within the network 100 according to the well-known client-server architecture. Each client computer system 104 relies on one or more of the server computer systems 102 to perform certain network services (e.g., network traffic management, file system management, shared peripheral device management, e-mail management, etc.).

It is noted that the embodiment of the network 100 of FIG. 1 is merely exemplary. For example, although the embodiment of the network 100 shown in FIG. 1 includes three servers 102 and three clients 104, in other embodiments the network 100 may have one or more servers 102 and/or one or more clients 104. It is also noted that while the network 100 of FIG. 1 has a bus topology, other topologies of the network 100 are possible and contemplated, including ring and star topologies, as well as multiples of such topologies.

Figure 2:
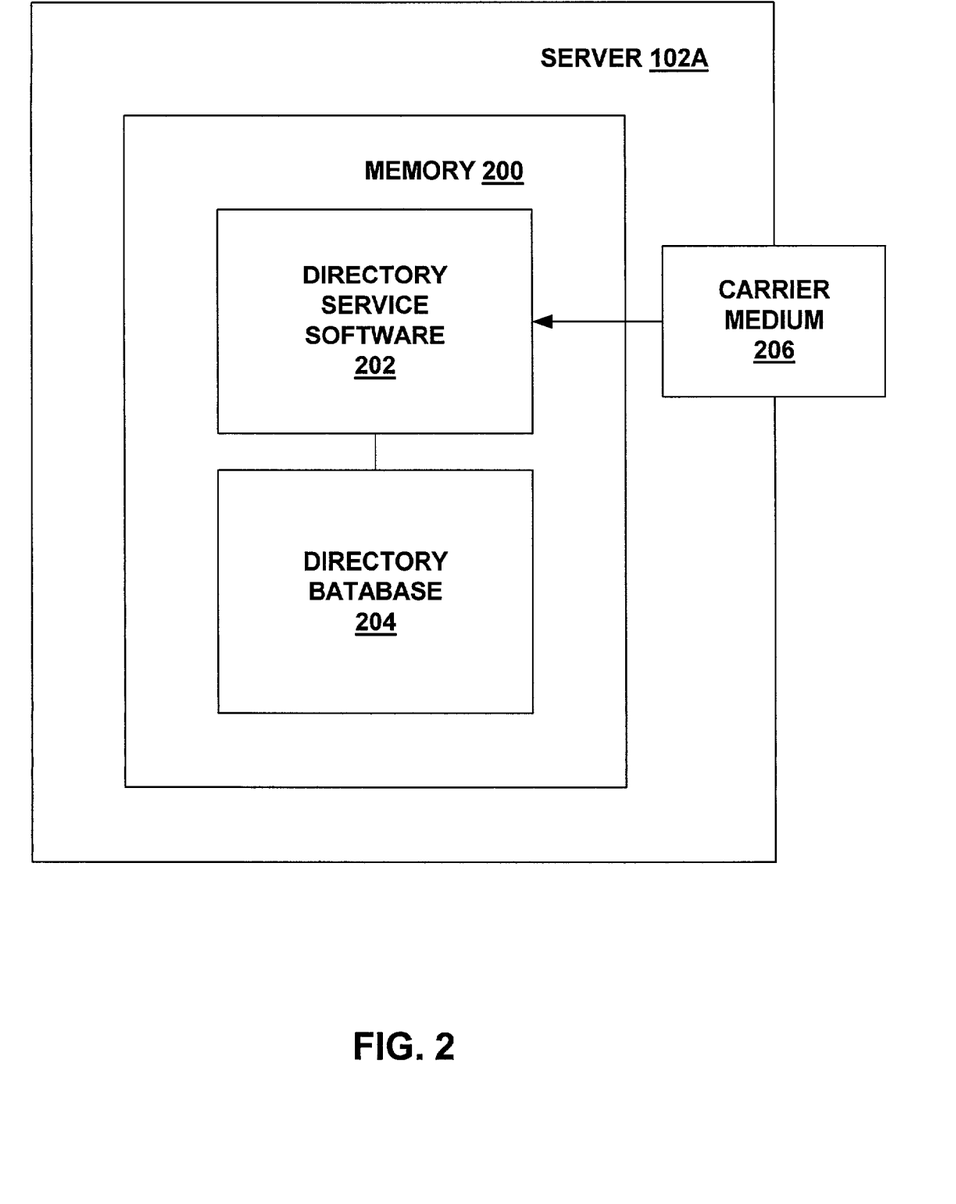
FIG. 2 is a diagram of one embodiment of a given one of the servers of FIG. 1, wherein the given one of the servers functions as a directory server within the network and includes a memory having a directory database stored therein.

The server 102A of FIG. 1 may function as a directory server within the network 100. FIG. 2 is a diagram of one embodiment of the server 102A of FIG. 1 wherein the server 102A includes a memory 200 having directory service software 202 and a directory database 204 stored therein. The memory 200 may include random access memory (RAM), and may also include other data storage components of a memory system of the server 102A (e.g., a hard disk drive). The directory database 204 is a database of network resources, including network devices and network data. The directory service software 202 includes instructions and data (i.e., code) that creates and maintains the directory database 204, and provides a directory service within the network 100. The directory service software 202 receives, processes, and responds to directory database queries from the clients 104. The directory database 204 will be described in more detail below.

The foregoing directory server provides directory service via the database 204 and service software 202, which collectively define relationships between users, network devices, application programs stored on the network (i.e., network application programs), and data stored on the network (i.e., network data). The directory service is useful for managing the network resources, securing the network, and controlling access to the network resources. For example, the directory server may require a user to provide identification criteria to the login server during the network login process (e.g., a user identification and user password) prior to any access to the network and network resources. After the user is authenticated, the user may be authorized to access network resources to which the user has access rights. The user's access rights may be stored in the directory service in any suitable organizational technique, such as a hierarchical tree structure. For example, access rights may be assigned to users by virtue of belonging to an organization. Additional access rights may be assigned to individual users by virtue of the particular groups to which they belong within the organization. Further access rights may be assigned to individual users by virtue of their individual responsibilities.

A carrier medium 206 in FIG. 2 is used to convey the directory service software 202 to the memory 200. As indicated in FIG. 2, part or all of the carrier medium 206 may be considered part of the server 102A. For example, the server 102A may include a disk drive for receiving removable disks (e.g., a floppy disk drive, a compact disk read only memory or CD-ROM drive, etc.), and the carrier medium 206 may be a disk (e.g., a floppy disk, a CD-ROM disk, etc.) embodying directory service software 202. The server 102A may read the code of directory service software 202 from the carrier medium 206 and store the code in the memory 200.

Alternately, the carrier medium 206 may be a signal used to convey the code of the directory service software 202. For example, the server 102A may include a network interface card, and the carrier medium 206 may be a signal (e.g., an electrical signal or an optical signal) conveyed via a transmission medium coupled to the network interface card. The server 102A may receive the code of the directory service software 202 via the carrier medium 206 and store the code in the memory 200.

It is noted that while FIG. 2 shows the directory service software 202 and the directory database 204 stored within the memory 200 of the server 102A, the directory service software 202 and/or the directory database 204 may be distributed among two or more of the server computer systems 102A, 102B, and 102C of FIG. 1. The two or more servers 102, including different portions of the directory database 204, may provide the directory service in combination. Moreover, the directory database 204 may be disposed on any suitable storage medium, including RAM, a hard disk drive, or removable media, such as a CD/DVD, a tape, a floppy disk, or any other desired storage medium.

Figure 3A:
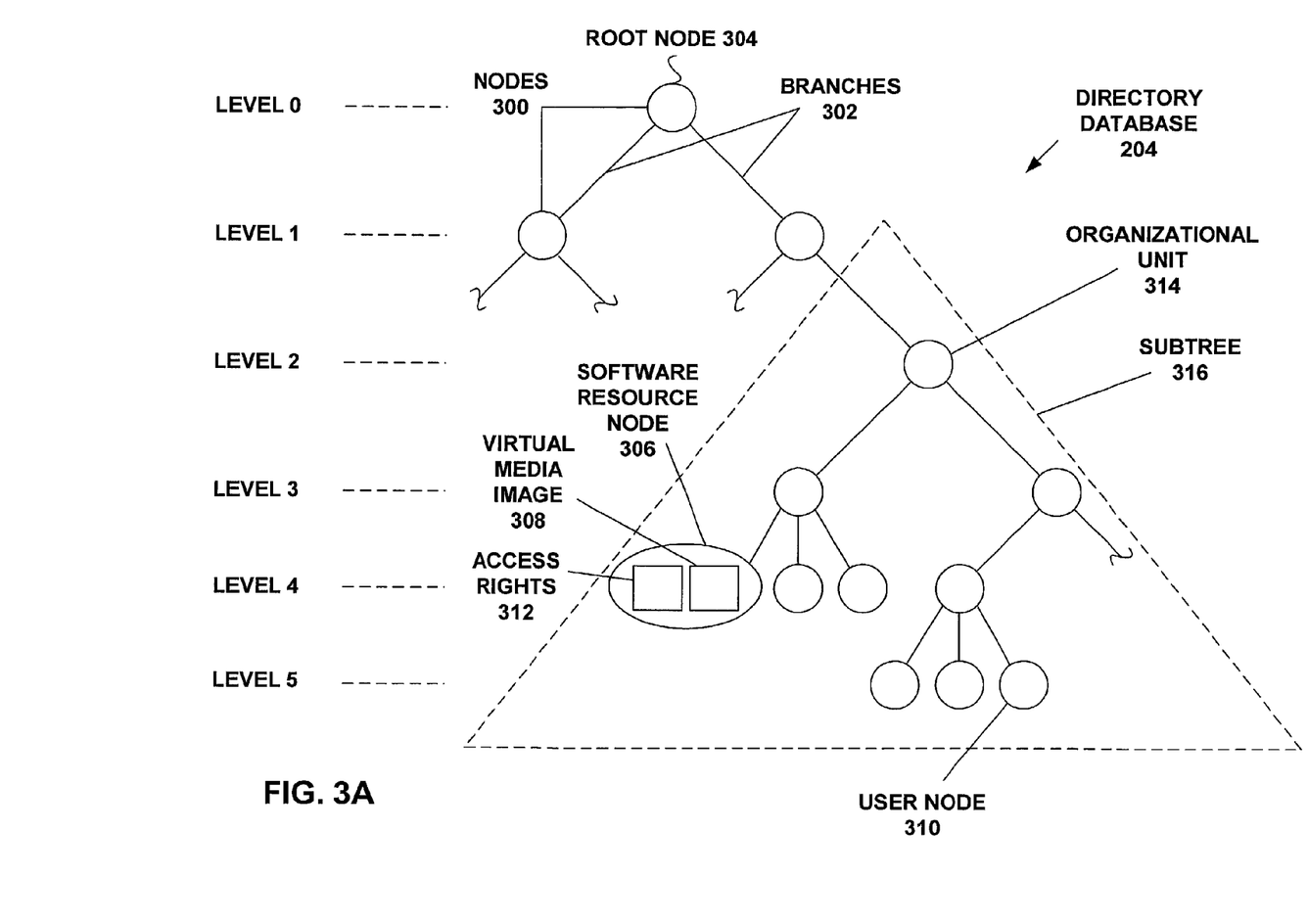
FIG. 3A is a diagram of one embodiment of the directory database of FIG. 2, wherein the directory database is arranged to form a hierarchical tree structure including multiple nodes connected by branches, and wherein the tree structure includes a software resource leaf node and a user leaf node, and wherein the user leaf node represents a specific user, and wherein the software resource leaf node includes a virtual media image and access rights of the specific user to the virtual media image.

The directory database 204 may be stored in any suitable directory structure and format, such as a hierarchical organizational structure. FIG. 3A is a diagram of one embodiment of the directory database 204 of FIG. 2. In the embodiment of FIG. 3A, the directory database 204 is arranged to form a hierarchical tree structure. The tree structure includes multiple nodes 300 connected by branches 302. The tree structure has multiple levels numbered consecutively starting with level '0', the highest level of the tree structure. A single root node 304 occupies the highest level 0 of the tree structure and, as illustrated in FIG. 3A, is connected to two different nodes at level 1 of the tree structure by two different branches. Each branch connects a node at one level in the tree structure to another node at a lower level within the tree structure. Each branch represents a logical relationship between the two connected nodes. Nodes not connected to other nodes of the tree structure via branches are called leaf nodes. Leaf nodes may represent network resources such as network devices (e.g., shared network devices such as printers, scanners, etc.) or users.

An organizational unit (OU) node 314 is understood to contain a sub-tree 316 of the tree structure of the directory database 204. The sub-tree 316 may include, for example, nodes representing resources assigned to a specific group within an organization. In FIG. 3A, the sub-tree 316 includes a software resource leaf node 306 and a user leaf node 310 representing a specific user. Software resource leaf node 306 includes a virtual media image 308 and access rights 312. Alternatively, the element 308 may represent a virtual media pointer, which directs the user or computer to the storage location for the virtual media image. For example, the element 308 may provide a storage address of a remote computer/server, which stores the virtual media image desired by the user.

The virtual media image 308 typically includes data stored according to a known or standard data storage mechanism or format (e.g., a file system format). A client 104 receiving the virtual media image 308 uses the known or standard data storage format to access the data. For example, the virtual media image 308 may be the expected contents of (i.e., an image of) a floppy diskette. In this situation, the virtual media image 308 includes target data and a file allocation table (FAT) describing where the target data is stored within the virtual media image 308 (i.e., upon a rotatable storage medium of the floppy diskette). The client computer system uses the FAT to access the target data within the virtual media image 308. Alternately, the virtual media image 308 may be an image of a compact disk read only memory (CD-ROM) disk. In this situation, the client 104 receiving the virtual media image 308 uses the standard data storage format of CD-ROM devices to access the target data within the virtual media image 308. Moreover, the virtual media image 308 may correspond to the data contents of a DVD, a tape storage medium, a ZIP disk, or any other desired removable media or data storage format.

Moreover, as noted above, the virtual media image 308 may be data indicating the location of (i.e., a pointer to) a data structure stored in another location within the network 100 and according to a known or standard data storage format. In this situation, the client 104 may use the virtual media image 308 to access the data structure, and may use the known or standard data storage format to access the target data within the data structure. A virtual media location pointer also may be provided at the element 308, which directs the user/computer to another location within the directory structure. For example, the element 308 may point to another node in the organization tree.

Figure 3B:
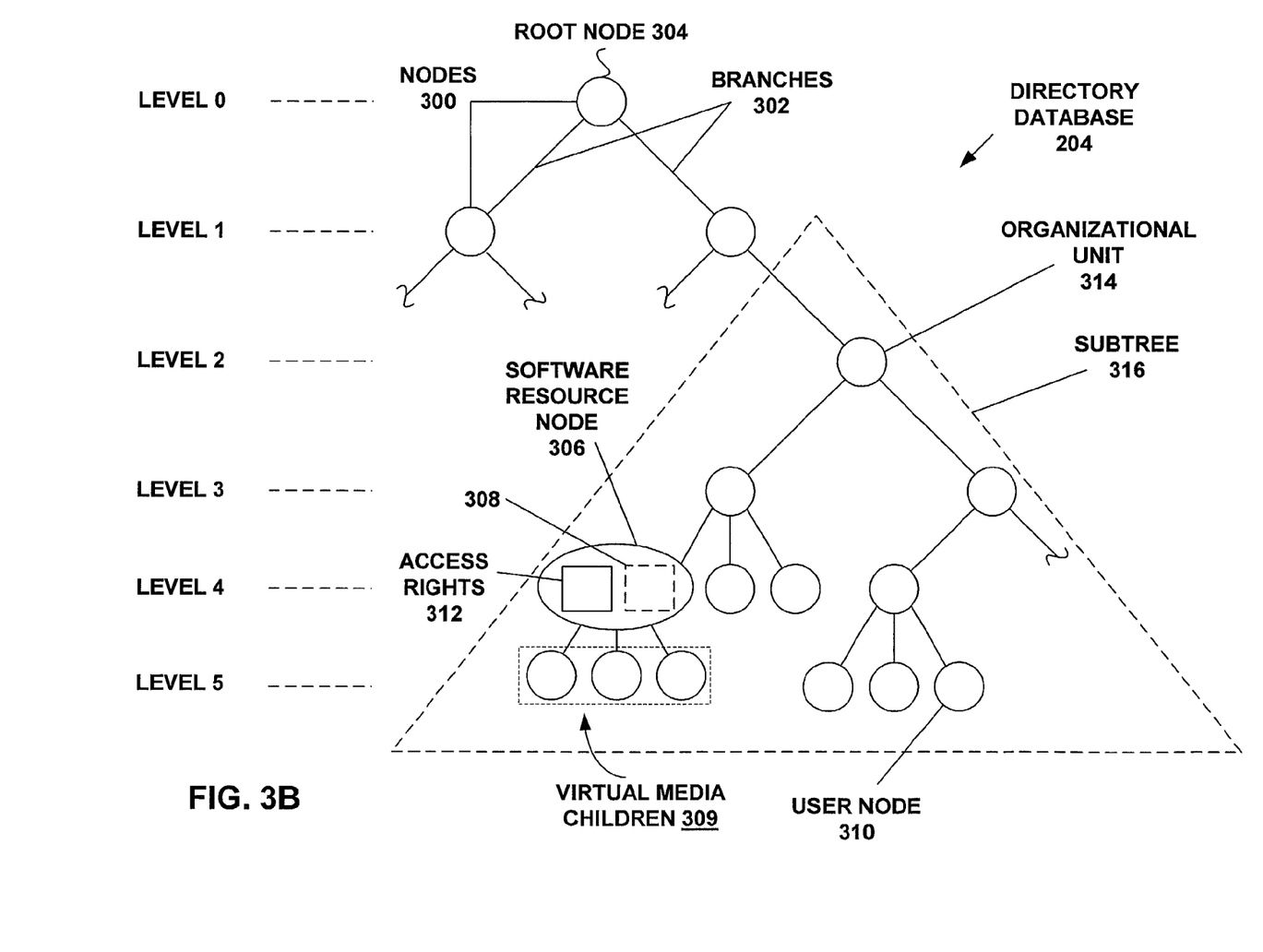
FIG. 3B is a diagram of an alternate embodiment of the directory database, wherein the virtual media leaf node has multiple branches leading to children of the virtual media image.

As illustrated in FIG. 3B, the virtual media image also may be stored as a plurality of sub-blocks, or children 309, which correspond to a particular virtual media image of an actual physical media. For example, as discussed in further detail below, the children 309 of the virtual media image may have memory sizes corresponding to 512K sectors, specific portions of data/applications within the virtual media image, or any other suitable breakdown of the virtual media. Accordingly, the storage of the virtual media as children 309 facilitates efficient data transfer of the desired portions of the virtual media.

Access rights 312 may solely determine the access rights of the specific user to the virtual media image 308. Alternately, organizational unit node 314 may also include access rights, and the access rights of the specific user to the virtual media image 308 may be determined by both the access rights within the organizational node 314 and the access rights 312 within the software resource leaf node 306. Further, container nodes along a path between the software resource leaf node 306 and the root node 304 may also include access rights, and the access rights of the specific user to the virtual media image 308 may be determined by the access rights within the container nodes along the path and the access rights 312 within the software resource leaf node 306. It also should be noted that the access rights 312 may control both the actual retrieval of the virtual media image 308, or the children 309, and the execution of applications disposed within the virtual media image 308 or children 309. For example, the user may have authorization to access the virtual media image 308, or one or more children 309, but the rights 312 may restrict the user from accessing a portion of the data or executing one or more of the applications disposed in the image 308 or children 309.

The target data within the virtual media image 308 may include instructions or code to initiate operation of one or more of the clients 104 (i.e., boot code). In this situation, a given one of the clients 104 receiving the virtual media image 308 may execute the boot code to boot the client 104. Alternately, the target data within the virtual media image 308 may include instructions of a software application program. In this situation, a given one of the clients 104 receiving virtual media image 308 may initiate or launch the application program. Further, the target data within the virtual media image 308 may include data needed by an application program running on one of the clients 104. In this situation, the client 104 receiving the virtual media image 308 may provide the target data to the application program.

Figure 4A:
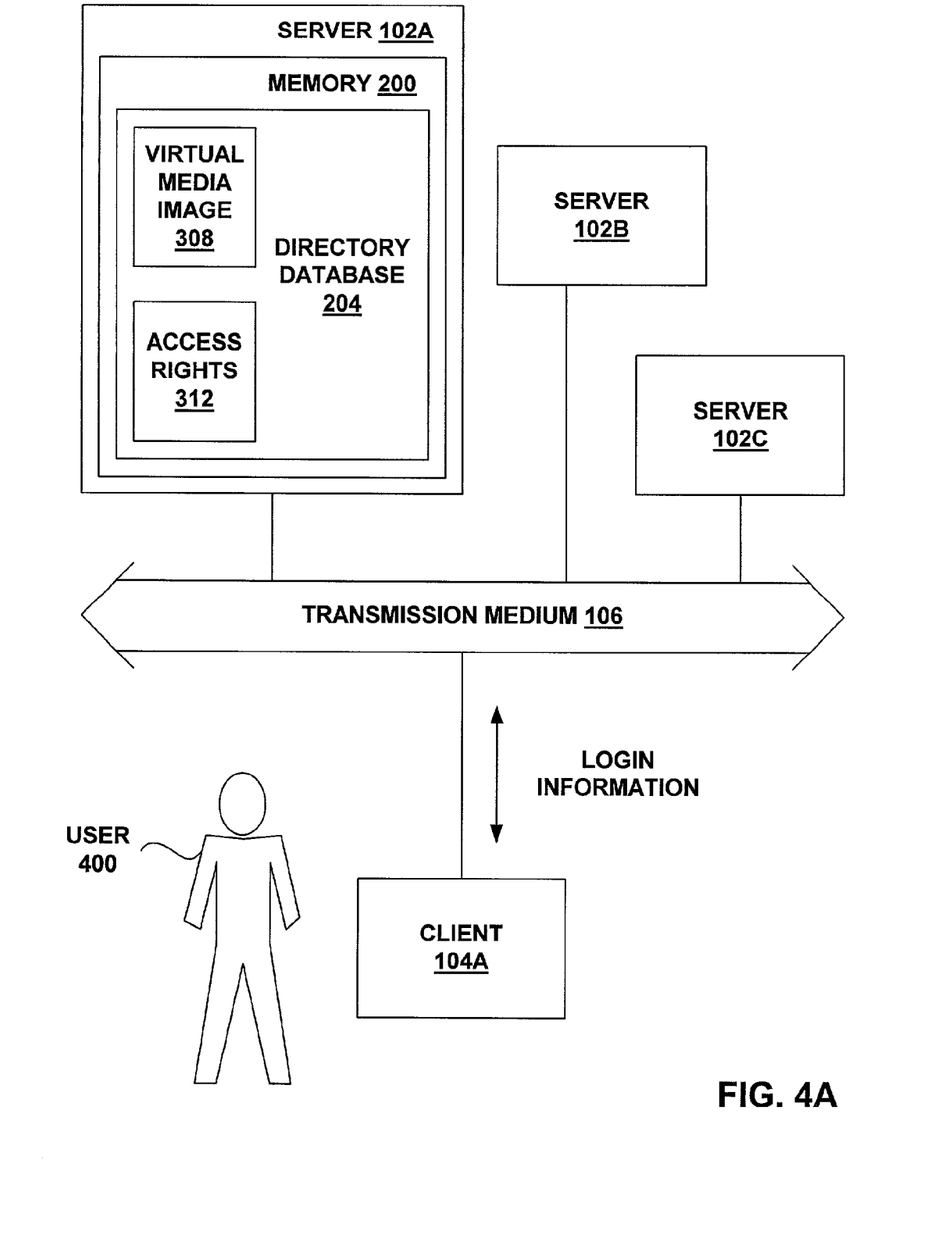
FIG. 4A is a diagram depicting a first step of a process whereby the specific user obtains the virtual media image of FIG. 3 via a particular client of the network of FIG. 1, wherein during the first step of the process the specific user logs in to the network via the particular client and is authenticated.
Figure 4B:
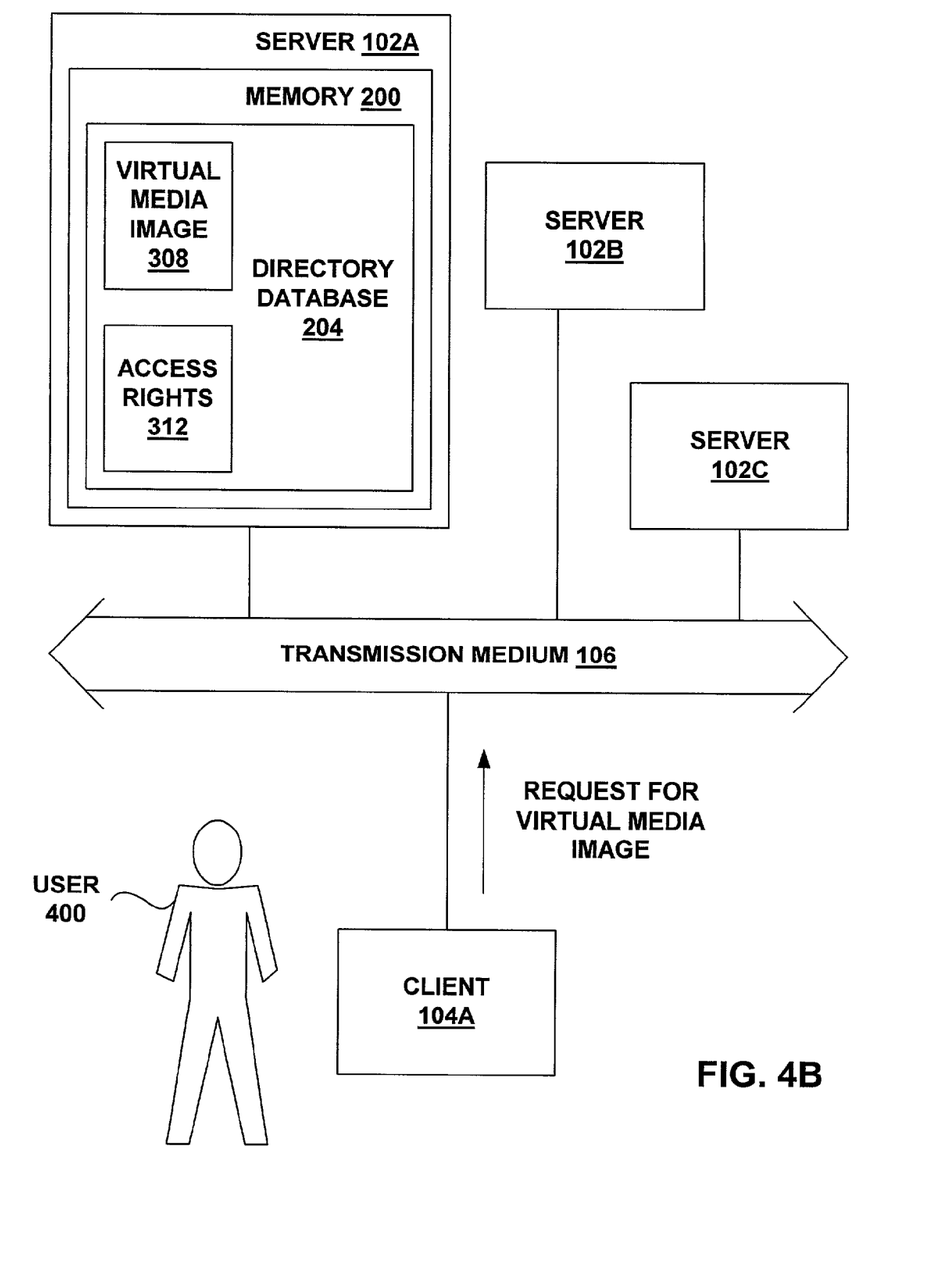
FIG. 4B is a diagram depicting a second step of the process wherein the particular client issues a request for the virtual media image.
Figure 4C:
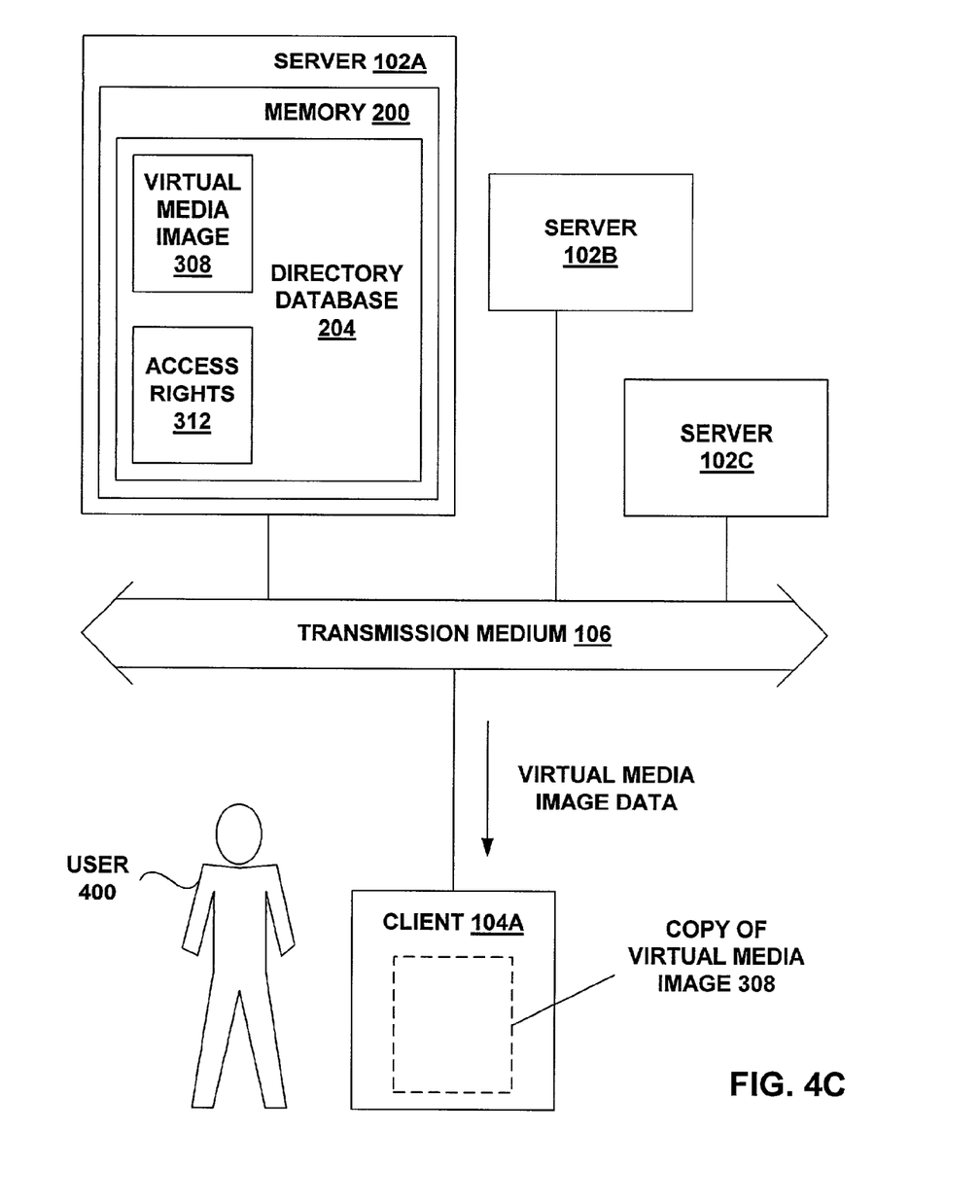
FIG. 4C is a diagram depicting the final step of the process wherein a copy of the virtual media image is conveyed to the particular client, wherein the copy of the virtual media image is conveyed to the particular client only if the access rights of the specific user indicate the specific user is permitted to access the virtual media image.

FIGS. 4A–4C will now be used to describe one embodiment of a process whereby the user represented by the user node 310 in FIG. 3, labeled 400 in FIG. 4, obtains the virtual media image 308 of FIG. 3 via the client computer system 104A of FIG. 1 (e.g., a workstation). Although the present technique is illustrated with reference to client and server computer systems, any suitable electronic or processor based device may be used within the scope of the present technique. For example, the client may embody a desktop computer, a portable computer, a personal digital assistant, or any other desired device. FIG. 4A is a diagram depicting a first step of the process wherein the user 400 logs onto the network 100 of FIG. 1 via the client 104A and is authenticated. During the login process, the client 104A and one or more of the servers 102 (e.g., a login server) exchange login information. The user 400 may, for example, provide a user ID and a password via a keyboard of the client 104A. During the login process, the directory database 204 may be queried using the user ID and the password (e.g., via a directory access protocol).

The client 104A may boot via a remote boot process, and the login step of FIG. 4A may be a preliminary step in the remote boot process. In this situation, the virtual media image 308 may include boot code (e.g., virtual media image 308 may be a boot image file). If the user 400 is authenticated using the user ID and the password, the client 104A may be provided with information indicating the location within the server 102A where the virtual media image 308 is stored (e.g., an address of the server 102A and a name of a file in which the virtual media image 308 is stored).

The following steps of the process depicted in FIGS. 4B and 4C are carried out after the user 400 is authenticated as shown in FIG. 4A and described above. FIG. 4B is a diagram depicting a second step of the process wherein the client 104A issues a request for the virtual media image 308. The request may include information indicating the location within the server 102A where the virtual media image 308 is stored (e.g., an address of the server 102A and a name of a file in which the virtual media image 308 is stored). In response to the request, the directory database 204 is queried (e.g., via the directory access protocol), and the access rights 312 (FIG. 3) of the user 400 are accessed within the directory database 204.

A final step of the process is carried out only if the access rights 312 of the user 400 indicate that the user 400 is permitted to access the virtual media image 308. FIG. 4C is a diagram depicting the final step of the process wherein a copy of the virtual media image 308 is conveyed to the client 104A. The virtual media image data is conveyed to the client 104A, and, as a result, a copy of the virtual media image 308 is created within the client 104A. The copy of the virtual media image 308 may be stored permanently within a non-volatile memory system (e.g., a hard disk drive) of the client 104A, or temporarily within a volatile memory system (e.g., random access memory or RAM) of the client 104A.

As described above, the target data within the virtual media image 308 may include boot code, and the client 104A may execute the boot code to boot the system. Alternately, the target data within the virtual media image 308 may include instructions of a software application program. In this situation, the client 104A may launch the application program. Further, the target data within the virtual media image 308 may include data needed by an application program running on the client 104A. In this situation, the client 104A may provide the target data to the application program.

Accordingly, the virtual media 308 stored in the remote directory service substantially eliminates the need for on-site installation, configuration, and maintenance of client computer systems, thereby increasing the time efficiency for executing such network management functions. The present technique is advantageous both for individual users and for network managers, because either of those users may have certain access rights to the virtual media 308. The present technique also distributes the network management functions among the individual users and the network manager. Individual users having appropriate access rights can quickly install and configure software applications without the need for an on-site network manager. Network managers can remotely retrieve or distribute software applications to any one or all of the network computers, which the network manager has access rights to manage.

A method for selectively providing virtual media to a network device may be derived from the above described process. Access rights of multiple authorized users may be stored in the software resource node 306 (FIG. 3). In response to receiving a request from a given one of the clients 104 (FIG. 1) to provide the virtual media image 308, the directory database 204 may provide the virtual media image 308 to the given client 104 only if: (i) the user operating the given client 104 is one of the multiple authorized users, and (ii) the access rights of the user indicate the user is permitted to access the virtual media image 308. Referring back to FIG. 2, the method may be embodied within the directory service software 202 residing within the memory 200 of the server 102A, and the directory service software 202 may be conveyed to the memory 200 via the carrier medium 206.

Figure 5:
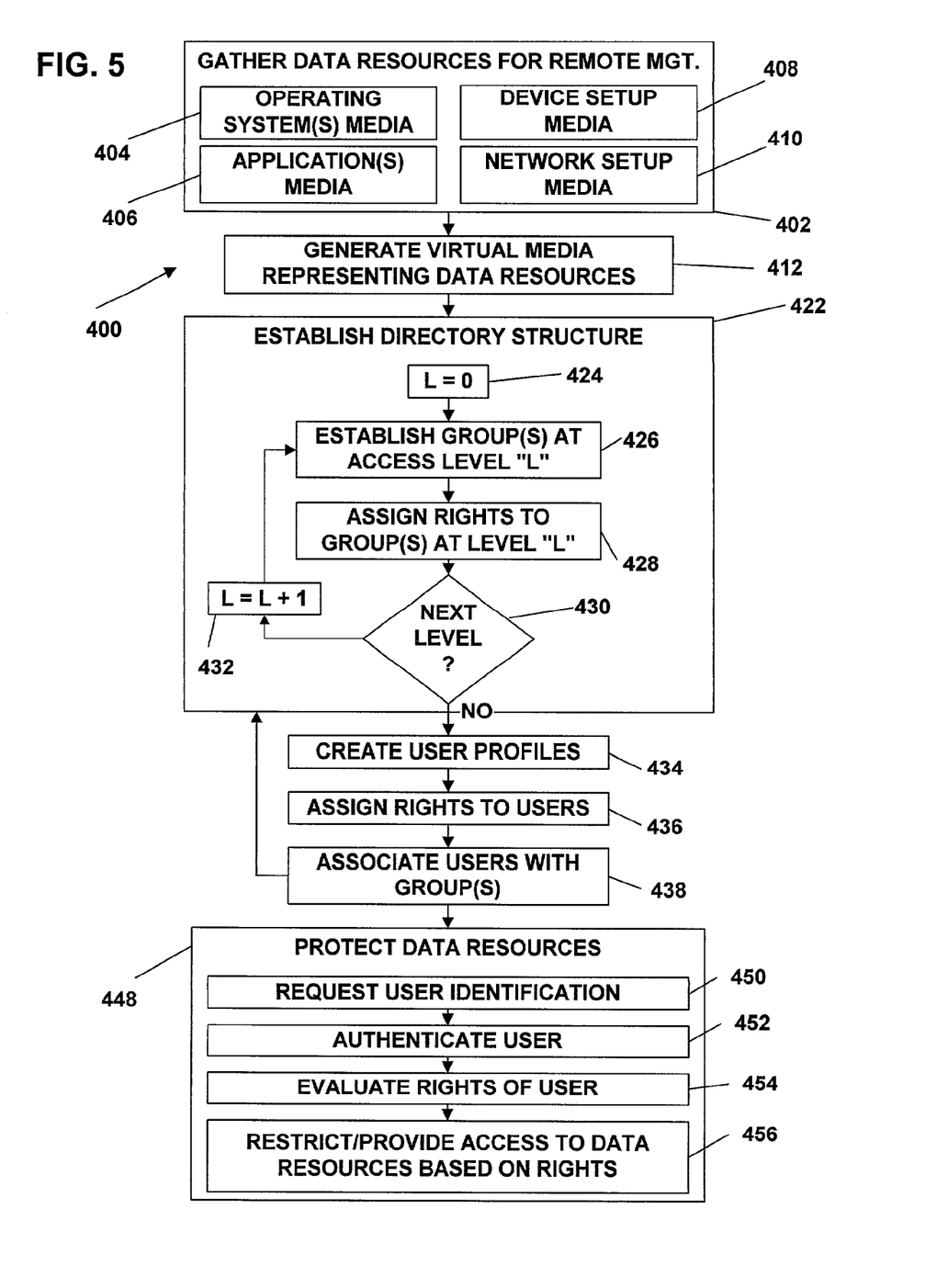
FIG. 5 is a flow chart illustrating exemplary data communication process comprising a hierarchical access structure for restricting access to data resources until the process authenticates the user as an authorized user and verifies the requested resources are within access rights of the authorized user.
Figure 6:
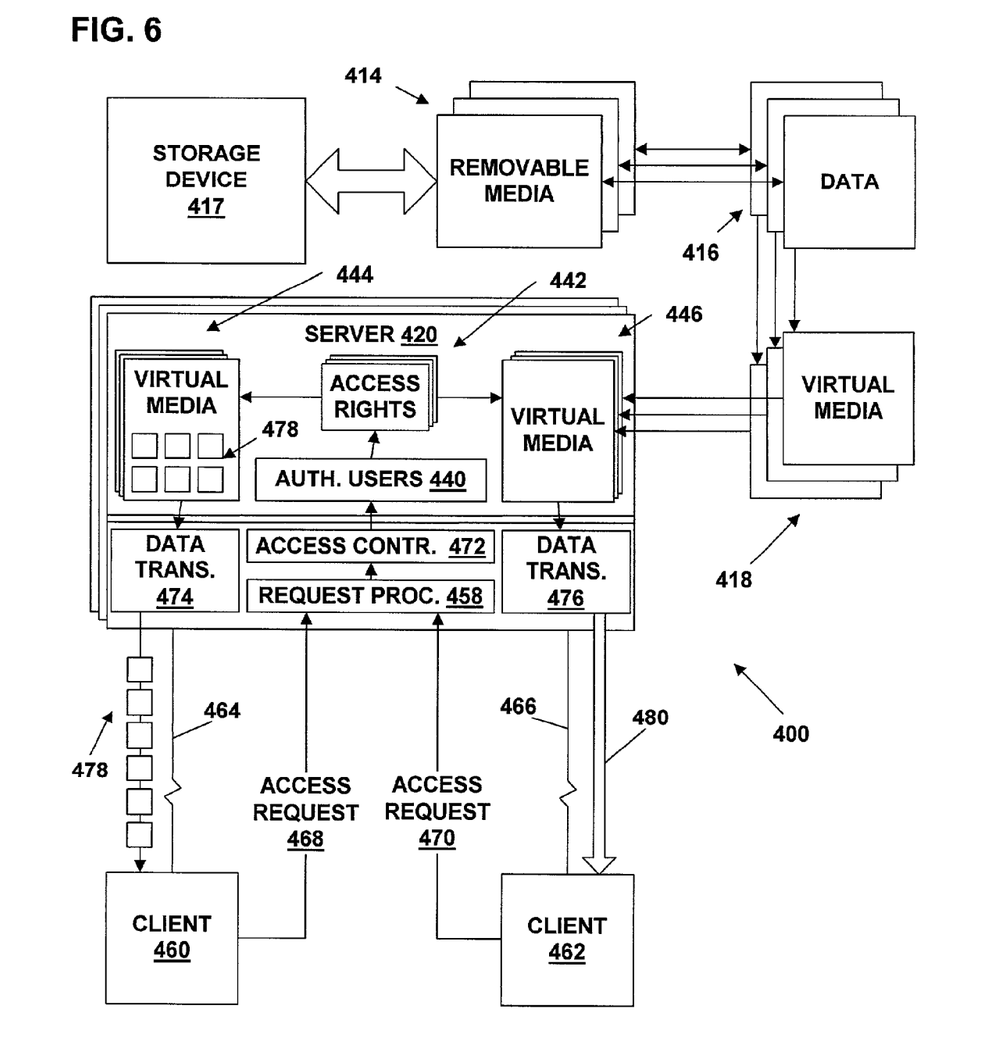
FIG. 6 is a diagram illustrating data storage and retrieval of virtual media according to the process illustrated in FIG. 5.

The foregoing techniques may be used to transfer, access, execute, initialize, or install any number of resources among any number of networked devices, such as multiple clients and multiple servers. FIGS. 5 and 6 are flow charts of an exemplary data communication process 400 of the present technique. The following discussion of the data communication process 400 will refer to FIGS. 5 and 6 simultaneously to better illustrate the unique directory controlled virtual media of the present technique. Although the process 400 may comprise a variety of data retrieval, data organization, and security schemes, the process 400 may begin by gathering data resources for remote management (block 402). The data resources may embody a variety of computing and network resources, such as operating systems media 404, applications media 406, device setup media 408, and network setup media 410. For example, the operating systems media 404 may comprise installation, boot-up, configuration and various other files for operating systems, such as Windows, DOS, UNIX, Linux, and a MAC OS. The applications media 406 may comprise installation, configuration and general data files for any software application, which may run on a computer system having a particular operating system. The device setup media 408 may comprise various installation and configuration files for the client computer system or device, which may be a diskless or headless device. The network setup media 410 may comprise various configuration files for communicating across an intranet or extranet, such as the Internet. The foregoing data resources 402 can be stored in any suitable format, such as the data format for CDs, DVDs, tape storage, floppy disks, zip disks, and various other removable and fixed data storage formats. Accordingly, the process 400 proceeds to generate virtual media representing the data resources and to catalog these virtual media images into a directory structure (block 412).

Referring now to FIG. 6, the virtual media may represent data content of a specific removable media, such as a floppy disk, a CD ROM disk, a CDRW disk, a DVD disk, a tape module, or any other desired storage media or format. For example, the virtual media may represent a set of removable media 414, which conventionally stores a set of data 416 that is accessible and executable by inserting each of the removable media 414 into a storage device 417. As described above, the set of removable media 414 may comprise a set of installation disks for an operating system or application program, a set of configuration disks for a device or desired communication scheme, or a variety of other media sets. In many computer systems, such as diskless and headless devices, physical media is not readily or efficiently accessible. Moreover, installation and configuration of hardware and software in network environments is typically performed locally one device at a time. The present technique transforms the foregoing removable media 414 into a set of virtual media 418, which comprises the data 416. As illustrated in FIG. 6, the virtual media 418 may represent an identical number of data sets corresponding to the data 416 stored on the removable media 414. The virtual media 418 is then stored on one or more servers 420, where the virtual media 418 has no physical form but represents a virtual data image of the data 416. In operation, an authorized user may initiate a software install process, an OS boot process, a device configuration process, or a variety of other processes on one or more client computer systems by accessing and retrieving virtual media corresponding to the desired files or removable media 414 after proper user identification and access right verification.

Referring back to FIG. 5, the virtual media images are stored in a directory structure, such as a hierarchical tree structure. Accordingly, the process 400 may establish a directory structure for the data resources (block 422) that can be used to control access rights to the various data resources (e.g., virtual media 418) stored in the server 420. For example, the directory structure may embody a pyramid or tree structure, which the process 400 forms as a series of authorized access levels for the data resources. At a highest access level 0 (block 424), the process 400 establishes one or more groups or organizational units (block 426) and then assigns one or more resource access rights to the foregoing groups (block 428). For example, at the highest access level 0, the groups or units may have access to virtually all of the data resources stored in the server 420. The process 400 then queries whether a next resource access level is desired in the directory structure (block 430). If another level is desired, then the process 400 proceeds to a sublevel 1 below the highest access level 0 (block 432). The process 400 continues through blocks 426, 428, 430 and 432 until the directory structure comprises the desired number of resource access levels for the data resources. The process 400 then proceeds to create user profiles for one or more authorized users of the data resources (block 434). Each of the authorized users is then assigned resource access rights based on individual status (block 436). The process 400 then associates each of the authorized users with one or more of the foregoing hierarchical groups or units (block 438). For example, as illustrated in FIG. 6, the server 420 stores a set of authorized users 440 and resource access rights 442 based on the foregoing hierarchical structure. Accordingly, each of the users may have access to a limited portion of the data resources, such as one of virtual media sets 444 and 446.

As illustrated in FIG. 5, the process 400 protects the foregoing data resources according to the directory structure (block 448). For example, the process 400 may request user identification (block 450) to authenticate the user's identity as one of the authorized users 440 stored on the server 420 (block 452) if the user is authenticated, then the process 400 may proceed to evaluate the resource access rights of the requesting user (block 454). Without giving any prior access to the data resources, the process 400 then proceeds to either restrict or provide access to the data resources based on the resource access rights of the authenticated user (block 456). If the requesting user is not authenticated or if an authenticated user lacks resource access rights for the desired resources, then the process 400 prevents the user from accessing the desired resources.

Referring now to FIG. 6, the one or more servers 420 comprise a request processor 458 to handle access requests from various users connected to the servers 420. For example, clients 460 and 462 may be coupled to the server 420 via communication routes 464 and 466, respectively. Each of these clients 460 and 462 may have different access rights and data resource requests, such as access requests 468 and 470, respectively. The one or more servers 420 also comprise an access controller 472, which may comprise a variety of security schemes and data protection modules. For example, the access controller 472 may comprise a user login module, a group login module, and a variety of resource access evaluators. In the illustrated embodiment, the access controller 472 authenticates the requesting users as one of the authorized users 440 and verifies that the desired resources of the requesting users are within the access rights 442 of those users. Accordingly, the one or more servers 420 transmit the requested data resources to the clients 460 and 462 via data transmitters 474 and 476, respectively.

In the illustrated embodiment of FIG. 6, the data transmitter 474 transmits the set of virtual media 444 to the client 460 as a series of data blocks or packets 478, while the transmitter 476 transmits the set of virtual media 446 to the client 462 as a series of data streams or virtual media blobs 480 for each of the virtual media within the set. Accordingly, the process 400 may electronically preserve the physical media object as the virtual media 446, which may be conceptualized as a single data stream or data blob for each respective physical or virtual media object. However, as illustrated by the series of data blocks 478, the process 400 may break each unit or media object of the set of virtual media 444 into desired packet sizes, which may be acquired as needed by the client 460. The block or packet sizes of blocks 478 may correspond to blocks of related data or blocks of a specific size, such as 512K packets. For example, the block size may be tailored to memory or other computer characteristics, such as the size of sectors (e.g., 512K), to facilitate more efficient and convenient storage, access and retrieval of the media. Accordingly, the process 400 allows the client 460 to obtain portions of the virtual media 444 in a block-by-block manner, which allows the user to obtain desired or needed portions of the media such as portions of setup or application files. The foregoing block-by-block transmission technique also prevents total data loss of the virtual media 444 in the event of communication interruption. If the data blocks or packets are disposed in related groups, then the client 460 may execute applications (i.e., setup or configuration files) disposed in those groups as the client 460 retrieves the virtual media 444 block-by-block.

As discussed in detail below, the foregoing directory service for virtual media images of physical media, such as computer disks associated with O/S boot files, O/S installation disks, and software applications disks, facilitates efficient and securely protected retrieval and distribution of the foregoing resources without the need for physical presence of the network manager or the physical media at the client computer system. Accordingly, the network manager is able to perform client configuration and maintenance functions more efficiently for the network computers. Individual users of the client computer systems are also able to retrieve desired boot files, installation disks, and other media as needed for setting up their computer system, provided the remote director service authenticates the user as an authorized user and verifies that the desired media resources are within that user's access rights. The foregoing technique also eliminates the security problem of remote boot processes, which do not restrict access to the boot files and do not verify the user's identity until the end of such boot processes. The secure directory service for virtual media images prevents any access to such boot files without prior verification of the user's identity and access rights for those boot files.

While the invention may be susceptible to various modifications and alternative forms, specific embodiments have been shown by way of example in the drawings and have been described in detail herein. However, it should be understood that the invention is not intended to be limited to the particular forms disclosed. Accordingly, the invention is intended to cover all modifications, equivalents, and alternatives falling within the spirit and scope of the invention as defined by the following appended claims. For example, the virtual media of the present technique may represent data contents of any suitable removable or fixed storage medium, including executable files, operating systems, applications software, and a variety of data for such executable programs. Additionally, the virtual media may be stored as data pointers to any desired local or remote storage device, and the virtual media may be stored in any suitable block size to facilitate efficient data transmission of the data contents of the virtual media.

What is claimed is:

1. A method for selectively providing data between networked devices, comprising the acts of:
    storing at least location references for virtual media resources, a plurality of authorized users, and access rights to the virtual media resources for each of the plurality of authorized users in a remote directory server, wherein the virtual media resources include a media image that simulates an actual removable computer disk and instructions disposed thereon, wherein the act of storing comprises the act of forming a hierarchical structure of the access rights for the plurality of authorized users, wherein the act of forming the hierarchical structure comprises the act of creating an organizational tree comprising at least one relationship branch having a plurality of nodes at a plurality of levels ranked with respect to one another, wherein each node represents at least one of the virtual media resources;
    receiving an access request for a desired resource of the virtual media resources at the remote directory server via a network; and
    responding to the access request based on the access rights of the authorized users by the remote directory server via the network.

2. The method of claim 1, wherein the act of storing at least location references for the virtual media resources comprises the act of obtaining a data image of a software resource in a data storage format of a standard data storage media.

3. The method of claim 1, comprising the act of generating the virtual media resources from content of a standard removable computer disk.

4. The method of claim 1, wherein the desired resource comprises at least one virtual media image of operating system installation files.

5. The method of claim 1, wherein the desired resource comprises at least one virtual media image of application program installation files.

6. The method of claim 1, wherein the desired resource comprises at least one virtual media image of application data files for use by a desired software application.

7. The method of claim 1, wherein the desired resource comprises data indicative of a data storage location of virtual media representing the desired resource.

8. The method of claim 1, wherein the act of responding to the access request comprises the act of protecting the virtual media resources against unauthorized access by a requesting user.

9. The method of claim 8, wherein the act of protecting the virtual media resources comprises the act of providing the desired resource to the requesting user only if the requesting user is authenticated as one of the plurality of authorized users and only if the authenticated requesting user has access rights to the desired resource.

10. The method of claim 8, wherein the act of protecting the virtual media resources comprises the acts of:
receiving identification information of a requesting user; and
authenticating the requesting user if the identification information indicates the requesting user as one of the plurality of authorized users.

11. The method of claim 10, wherein the act of protecting the virtual media resources further comprises the act of:
evaluating the access request for the desired resource against the access rights of the requesting user after user authentication.

12. A method for selectively providing data between networked devices, comprising the acts of:
forming a hierarchical user access tree comprising at least one relationship branch having a plurality of nodes at a plurality of levels ranked with respect to one another;
associating at least location references for a plurality of virtual media resources to the plurality of nodes, wherein the virtual media resources include a simulation of an actual content-filled computer disk having instructions;
storing access rights of authorized users at each of the plurality of nodes;
processing an access request for a desired resource of the plurality of virtual media resources by verifying that a requesting user is one of the plurality of authorized users and verifying that the desired resource is within the access rights of the verified requesting user.

13. The method of claim 12, wherein the act of associating the plurality of virtual media resources comprises the act of storing virtual media images representing data contents of physical media for a data storage device.

14. The method of claim 13, further comprising the act of transmitting the virtual media image corresponding to the desired resource to the verified requesting user having access rights encompassing the desired resource.

15. A system, comprising:
a plurality of devices disposed in a network;
a database of resources disposed on one of the plurality of devices, wherein the resources comprise at least location references for a plurality of virtual media resources, a plurality of authorized users, and access rights of the authorized users to authorized portions of the plurality of virtual media resources, wherein the virtual media resources include a computer simulation that represents instructional content and behavior of an actual removable computer disk, wherein the database is organized as a hierarchical tree structure comprising at least one relationship branch having a plurality of nodes at a plurality of levels ranked with respect to one another, wherein each node represents one portion of the plurality of virtual media resources;
an access protection module disposed on one of the plurality of devices and configured for restricting access of the plurality of virtual media resources to authorized users having appropriate access rights; and
a request processing module disposed on one of the plurality of devices and configured for processing a resource request by a user for a desired portion of the plurality of virtual media resources according to the access protection module.

16. The system of claim 15, wherein the database, the access protection module, and the request processing module are disposed on a directory server.

17. The system of claim 15, wherein the plurality of virtual media resources comprise data images of physical media for standard data storage devices.

18. The system of claim 17, wherein at least one of the data images represents physical media for loading an operating system.

19. The system of claim 17, wherein at least one of the data images represents physical media for loading an application program.

* * * * *

UNITED STATES PATENT AND TRADEMARK OFFICE
CERTIFICATE OF CORRECTION

PATENT NO. : 7,076,796 B2
APPLICATION NO. : 10/038239
DATED : July 11, 2006
INVENTOR(S) : Drue A. Reeves et al.

It is certified that error appears in the above-identified patent and that said Letters Patent is hereby corrected as shown below:

In column 1, line 52, delete "modem" and insert -- modern --, therefor.

In column 14, line 4, in Claim 13, delete "the plurality of virtual media resources" before "comprises".

Signed and Sealed this

Third Day of March, 2009

JOHN DOLL
*Acting Director of the United States Patent and Trademark Office*